United States Patent [19]

Kitayama et al.

[11] Patent Number: 4,940,306
[45] Date of Patent: Jul. 10, 1990

[54] STAR NETWORK OPTICAL TRANSMISSION SYSTEM

[75] Inventors: Tadayoshi Kitayama; Kiwami Matsushita; Kuniaki Motoshima, all of Kanagawa, Japan

[73] Assignee: Mitsubishi Denki Kabushiki Kaisha, Tokyo, Japan

[21] Appl. No.: 300,786

[22] Filed: Jan. 23, 1989

[30] Foreign Application Priority Data

| Jan. 28, 1988 | [JP] | Japan | 63-18083 |
| Mar. 4, 1988 | [JP] | Japan | 63-51136 |
| Nov. 26, 1988 | [JP] | Japan | 63-298799 |

[51] Int. Cl.[5] .............................. G02B 6/28
[52] U.S. Cl. ...................... 350/96.16; 350/96.15
[58] Field of Search .................. 350/96.15, 96.16; 455/610, 612

[56] References Cited

U.S. PATENT DOCUMENTS

| 4,089,584 | 5/1978 | Polczynski | 350/96.16 |
| 4,240,694 | 12/1980 | Pan | 350/96.16 |
| 4,257,124 | 3/1981 | Porter et al. | 455/601 |
| 4,366,565 | 12/1982 | Herskowitz | 455/612 |
| 4,580,872 | 4/1986 | Bhatt et al. | 350/96.16 |
| 4,646,361 | 2/1987 | Usui | 455/601 |
| 4,708,424 | 11/1987 | Marhic | 350/96.16 |
| 4,726,644 | 2/1988 | Mathis | 350/96.16 |
| 4,850,042 | 7/1989 | Petronio et al. | 455/612 |
| 4,850,043 | 7/1989 | Winston | 455/612 |

OTHER PUBLICATIONS

"Optical Star Network Using Wavelength-Division Multiplexing" (by Hiroo Okuhara et al., Toshiba Review, vol. 40, No. 7, pp. 627–629, 1985).
"Broadcast Television via Passive Optical Networks" (by D. W. Faulkner, 13th ECOC Technical Digest, vol. 1, p. 283, 1987).

Primary Examiner—William L. Sikes
Assistant Examiner—John Ngo
Attorney, Agent, or Firm—Wolf, Greenfield & Sacks

[57] ABSTRACT

A star network optical transmission system comprising a star coupler as a center node, wherein a star coupler is provided with an optical fiber exhibiting a multimode transmission characteristic to an optical signal transmitted by said star coupler at an input portion and an output portion, an optical transmission apparatus having a laser with a wavelength of $\lambda$ as a light source, an up optical fiber exhibiting a single mode transmission characteristic to a wavelength of $\lambda$ connecting the optical transmission apparatus to the star coupler, an optical reception apparatus, and a down optical fiber exhibiting a multimode transmission characteristic at a wavelength $\lambda$ and connecting the optical reception apparatus to said star coupler.

14 Claims, 9 Drawing Sheets

STAR NETWORK OPTICAL TRANSMISSION SYSTEM

BACKGROUND OF THE INVENTION;

1. Field of the Invention:

The present invention generally relates to a star network optical transmission system, and more particularly to a star network optical transmission system which employs an optical transmission apparatus comprising a star coupler as a center node and a laser diode (LD) as a light source to effect optical fiber transmission and further particularly to a star network optical transmission system in which optical signal is branched and transmitted via a star coupler.

2. Prior Art

Figure 5:
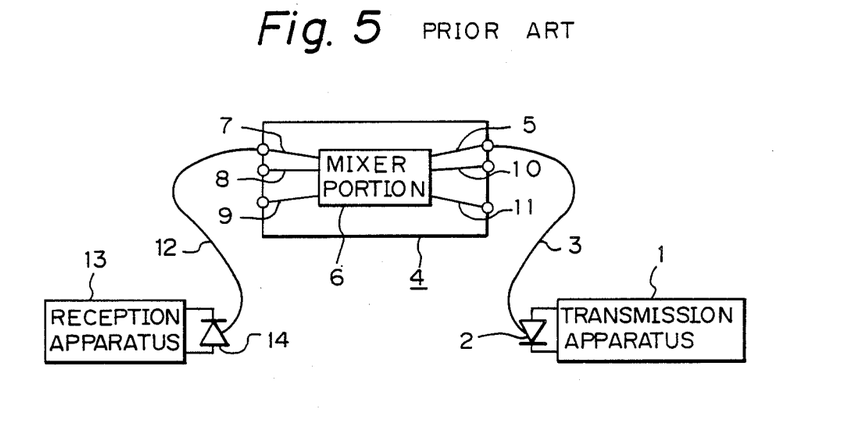
FIG. 5 is a diagram illustrating the conventional star network optical transmission system.

FIG. 5 is a diagram illustrating the configuration of the prior art star network optical transmission system as disclosed in "Toshiba Review", vol. 40, No. 7 (1985), p. 627-629 ("Optical Star Network Using Wavelength-Division Multiplexing"). In FIG. 5, shown at 1, 2, 3 and 4 are a transmission apparatus, a laser diode (LD), an up optical fiber comprising a multimode optical fiber and a star coupler for multimode optical fiber, respectively. Shown at 5, 10 and 11 are optical fibers at the input portion in the star coupler. Shown at 6 is a mixer portion in the star coupler 4. Shown at 7, 8 and 9 are optical fibers at the output portion in the star coupler 4. Shown at 12, 13 and 14 are a down optical fiber comprising a multimode optical fiber, a reception apparatus and a light receiving element, respectively.

Figure 6:
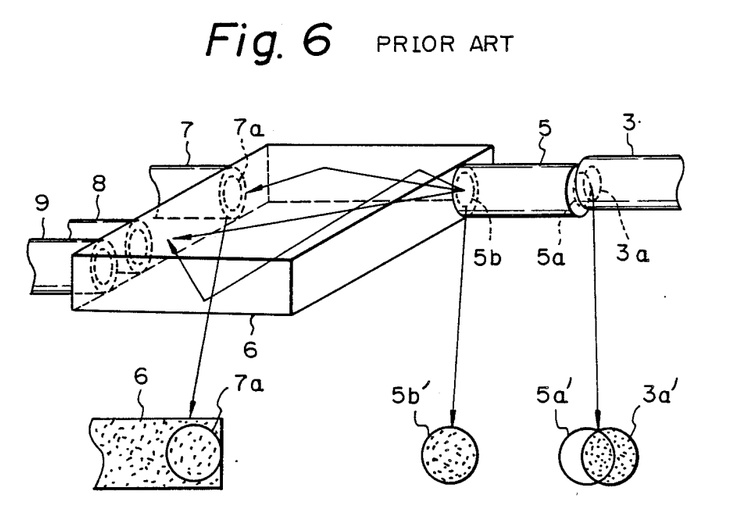
FIG. 6 is a diagram illustrating the operation of the star network optical transmission system of FIG. 5.

FIG. 6 is a diagram illustrating the operation of the star network optical transmission system of FIG. 5. In FIG. 6, shown at 3a, 5a, 5b and 7a are outer diameter of the core of the up optical fiber 3, outer diameter of the core of one end of the optical fiber 5 at the input portion, outer diameter of the core of the other end of the optical fiber 5 at the input portion and outer diameter of the core of the optical fiber 7 at the output portion, respectively. Like numerals are used where the components are the same as those of FIG. 5. The detailed description of those components is omitted.

The operation of the prior art star network optical transmission system will be described hereinafter. The transmission apparatus 1 converts transmission signal to optical signal of a wavelength λ through the laser diode 2, and then outputs it to the up optical fiber 3 comprising a multimode optical fiber exhibiting a multimode transmission characteristic to optical signal of a wavelength λ. The laser diode 2 is a commonly used Fabry-Perot type laser diode and is adapted to oscillate in a multivertical mode during modulation. The up optical fiber 3 is connected to the optical fiber 5 at the input portion in the star coupler 4 for multimode optical fiber. The optical signal inputted to the optical fiber 5 at the input portion is then inputted to the mixer portion 6 where it is propagated so that beams are equally dispersed and coupled to the plurality of optical fibers 7, 8 and 9 at the output portion in principle. If there are further provided optical fibers 10 and 11 at the input portion, each fiber output is equally dispersed and coupled to the optical fibers 7, 8 and 9 at the output portion. The optical fibers 5, 10 and 11 at the input portion and the optical fibers 7, 8 and 9 at the output portion exhibit a multimode transmission characteristic to a wavelength of λ. The optical fiber 7 at the output portion in the star coupler 4 is connected to the down optical fiber 12 comprising a multimode transmission characteristic to optical signal of a wavelength λ. The optical signal transmitted to the down optical fiber 12 is then optoelectrically converted by the light receiving element 14 in the reception apparatus 13. Thus, the signal from the transmission apparatus 1 is received.

The above described laser diode 2 is a light source having a strong coherence. When the optical signal outputted from the laser diode 2 is coupled and transmitted to the up optical fiber 3, the power strength distribution developed in the core outer diameter 3a is in a speckle pattern of large particles because of coherence as shown in FIG. 6. If there is an axis shift or the like between the core outer diameter 3a of the up optical fiber 3 and the core outer diameter 5a of one end of the optical fiber 5 at the input portion in the star coupler 4, only a part of the speckle pattern of the former fiber is coupled to the speckle pattern of the latter fiber. Also, in the end surface of the connection between the optical fiber 5 at the input portion and the mixer portion 6, a speckle pattern is developed in the core outer diameter 5b of the other end of the optical fiber 5 at the input portion. In the mixer portion 6 of the star coupler 4, optical signal outputted from the optical fiber 5 at the input portion is propagated while undergoing the multiple reflection between the walls of the mixer portion 6 so that a uniform optical power distribution is developed on the end surface of the output. However, a speckle pattern is still left. A stable optical power is coupled to the core outer diameter 7a of the optical fiber 7 at the output portion so far as such a speckle pattern is stable.

Configured as described above, the prior art star network optical transmission system is disadvantageous in that the vibration of the up optical fiber 3 or the temperature characteristics of the laser diode 2 causes a fluctuation in the speckle pattern developed on the end surface of the connection between the up optical fiber 3 and the optical fiber 5 at the input portion which can cause a deviation in the rate of coupling to the optical fibers 7, 8 and 9 at the output end surface in the mixer portion 6, resulting in the generation of so-called modal noise which deteriorates S/N ratio of transmission signal.

Further, if there is an axis shift in the end surface of the connection between the optical fiber 5 at the input portion and the optical fiber 3 in the star coupler 4, such a deterioration in S/N ratio becomes remarkable. Furthermore, since the laser diode oscillates in a multivertical mode, a phenomenon called mode distribution characteristic causes a fluctuation in the oscillation spectrum for every pulse of transmission data during data transmission at a high rate of 100 Mb/s or more, worsening the effect of modal noise.

The present invention has been attained in order to overcome these programs. It is an object of the present invention to provide a star network optical transmission system which reduces the fluctuation in the speckle pattern developed on the output end surface of a mixer portion in a star coupler caused by the vibration of an optical fiber or the temperature characteristics or mode distribution characteristics of a laser diode to obtain a stable coupling characteristic, enabling signal transmission with a high S/N ratio.

Figures 12, 13:
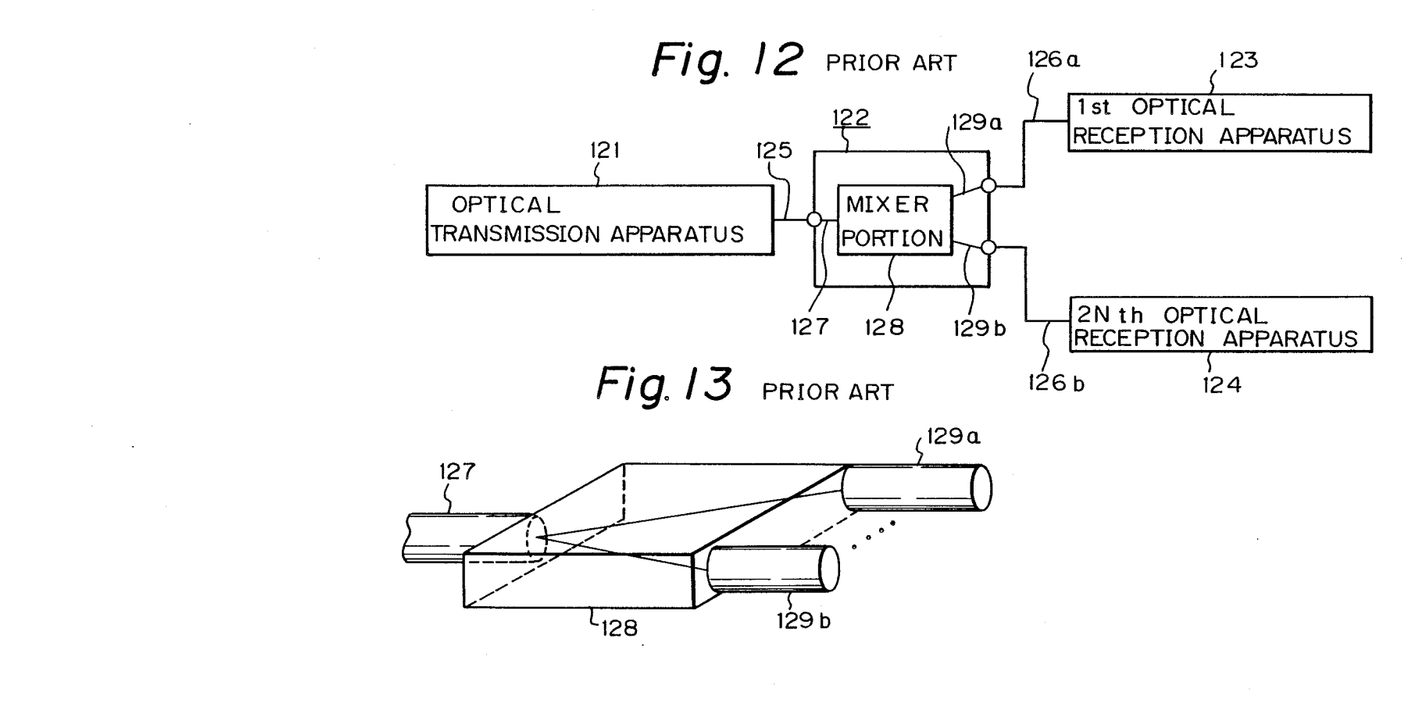
FIG. 12 is a configuration diagram of the conventional star network optical transmission system.
FIG. 13 is a diagram illustrating the operation of the conventional star coupler of FIG. 12.

Further, FIG. 12 shows another example of the prior art star network optical transmission system as described in D. W. Faulkner, "Broadcast Television via Passive Optical Networks", 13th ECOC Technical Digest vol. 1, p. 283 (1987). Shown at 122, 122, 123 and 124 in FIG. 12 are an optical transmission apparatus, a one-input 2N (N is an integer) output star coupler (hereinafter simply referred to as "[1×2N] star coupler"), and a 1st and 2Nth optical reception apparatus, respectively. Shown at 125, 126a and 126b are optical fibers. Shown at 127 and 128 are an input optical fiber and a mixer portion. Shown at 129a and 129b are output optical fibers. FIG. 13 is a diagram illustrating the operation of the star coupler 122. Optical signal inputted from the input optical fiber 127 is diffused at the mixer portion 128, and then distributed into the output optical fibers 129a and 129b.

The operation of the conventional star network optical transmission system will be described with reference to FIG. 12. In this optical transmission system, optical signal transmitted by the optical transmission apparatus 121 is branched by the star coupler 122 to 2N branches, and then transmitted to the optical reception apparatus 123 and the 2Nth optical reception apparatus 124.

Optical signal transmitted by the optical transmission apparatus 121 is transmitted to the star coupler 122 via the optical fiber 125. In the star coupler 122, the transmitted optical signal is then propagated by the input optical fiber 127 to the mixer portion 128 where it is diffused and then equally distributed to 2N output optical fibers 129a to 129b. The optical signals thus equally distributed are transmitted to the 1st to 2Nth optical reception apparatus 123 to 124 via the optical fibers 126a to 126b connected to the output optical fibers 129a to 129b, respectively.

Configured as described above, the conventional star network optical transmission system requires the use of a star coupler having the same number of output ports as that of the branches or a plurality of star couplers having a less number of output ports to form a multi-branch system. In this configuration, as the number of branches increases, the number of branch systems increases, making the system larger in size and expensive to implement. Furthermore, in order to manufacture a [1×N] star coupler having a plurality of output ports, a [2N×2N] star coupler having a plurality of input ports and output ports is actually manufactured in the manufacturing process. These input ports of the star coupler thus manufactured are used singly. Thus, such a star coupler exhibits a low cost performance.

The present invention has been attained in order to overcome these problems. It is an object of the present invention to provide a star network optical transmission system which uses an [N+1]×N+1] star coupler to enable 2N branching of optical signal.

SUMMARY OF THE INVENTION

In accordance with a first aspect of the present invention, a star network optical transmission system of the present invention is provided which comprises an optical fiber at the input portion of a star coupler and a transmission apparatus are connected to each other via an up optical fiber comprising a single mode optical fiber exhibiting a single mode transmission characteristic to a wavelength of $\lambda$.

In this star network optical transmission system, the optical fiber at the input portion in the star coupler and the transmission apparatus are connected to each other via an up optical fiber comprising a single mode optical fiber. In this configuration, no speckle pattern is developed on the output end surface of the up optical fiber. Furthermore, since the single mode optical fiber as the up optical fiber has a smaller core diameter than a multi-mode optical fiber, stable coupling of speckle patterns is made on the end surface of the connection between the up optical fiber and the star coupler, reducing the generation of modal noise.

As described above, the star network optical transmission system according to the present invention has a configuration in which an optical fiber at the input portion of a star coupler and a transmission apparatus are connected to each other via an up optical fiber comprising a single mode optical fiber exhibiting a single mode transmission characteristic to a wavelength $\lambda$. In this configuration, stable coupling of speckle patterns is made on the surface of the connection between the up optical fiber and the star coupler, making it possible to transmit signal with less modal noise.

In accordance with a second aspect of the present invention of a star network optical transmission system of the present invention is provided which comprises a dynamic single mode laser diode of a wavelength $\lambda$ which oscillates in a monovertical mode during modulation, is used as a light source in an optical transmission apparatus, and an optical fiber at the input portion of a star coupler and an optical transmission apparatus are connected to each other via an up optical fiber comprising a single mode optical fiber exhibiting a single mode transmission characteristic to a wavelength of $\lambda$.

In this star network optical transmission system, a distribution feedback type laser of a wavelength $\lambda$ which oscillates in a monovertical mode even during high rate modulation is used as a light source in an optical transmission apparatus so that modal noise caused by the fluctuation in the oscillation spectrum due to mode distribution characteristic can be eliminated. Furthermore, the optical fiber at the input portion in the star coupler and the optical transmission apparatus are connected to each other via an optical fiber comprising a single mode optical fiber so that no speckle pattern is developed on the output end surface of the up optical fiber. Moreover, since the single mode optical fiber as up optical fiber has a smaller core diameter than a multi-mode optical fiber, a stable coupling of speckle pattern is made on the end surface of the connection between the up optical fiber and the star coupler, reducing the generation of modal noise.

As described above, the star network optical transmission system according to the present invention has a configuration in which a dynamic single mode laser diode which oscillates in a monovertical mode during modulation is used as a light source in an optical transmission apparatus and an optical fiber at the input portion of a star coupler and an optical transmission apparatus are connected to each other via an up optical fiber comprising a single mode optical fiber exhibiting a single mode transmission characteristic to a wavelength of $\lambda$. In this configuration, stable coupling of speckle patterns is made on the end surface of the connection between the up optical fiber and the star coupler, making it possible to transmit a signal with less modal noise.

In accordance with a third aspect of the present invention, a star network optical transmission system is provided wherein an optical transmission apparatus outputs signals to two optical fibers. One of the two optical fibers is connected to an input port of a star coupler, and the other to an output of the star coupler. The other input and output ports which are not connected to the optical transmission apparatus are connected to the optical reception apparatus via optical fibers.

In this star network optical transmission system according to the present invention, signals inputted from the optical transmission apparatus to the input and output ports can be coupled to an output port and an input port, respectively, without interferring with each other due to the directional coupling characteristics of the star coupler. Thus, with an [N+1]×[N+1] star coupler, a 2N branch transmission system can be obtained.

As described above, the present invention enables star couplers to operate bidirectionally. Thus, star couplers required to obtain the same number of branches can be obtained in a smaller size at a lower cost as compared to the conventional system.

BRIEF DESCRIPTION OF THE DRAWINGS

These and other objects and many of the attendant advantages of the present invention will be readily appreciated as the same becomes better understood by reference to the following detailed description when considered in connection with the accompanying drawings wherein like parts in each of the figures are designated by the same reference characters and in which.

DETAILED DESCRIPTION OF THE PREFERRED EMBODIMENTS

Figure 1A:
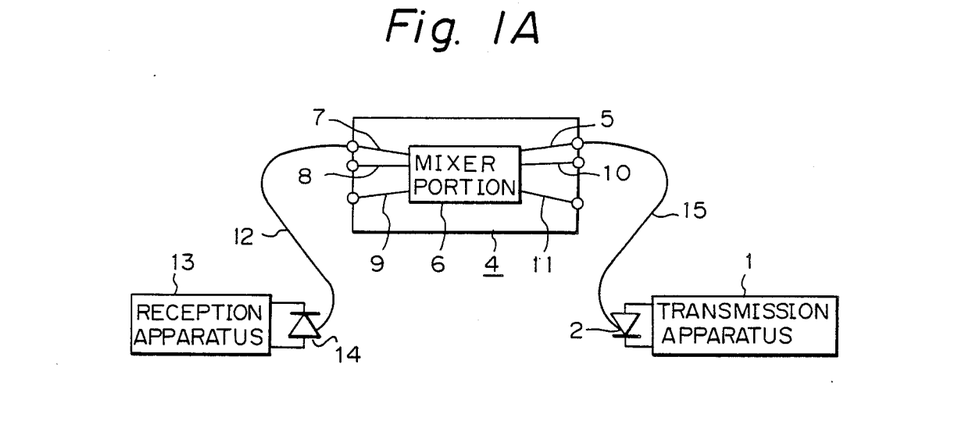
FIG. 1A is a diagram illustrating the configuration of an embodiment of the star network optical transmission system according to the present invention.
Figure 2A:
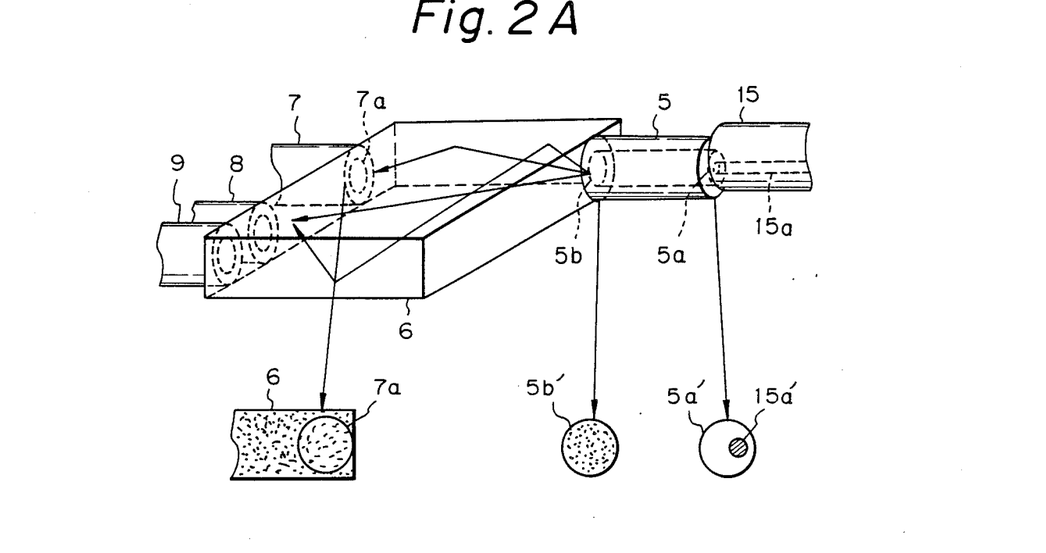
FIGS. 2A and 2B are diagrams illustrating the operation of the star network optical transmission systems of FIGS. 1A and 1B respectively.

FIG. 1A is a diagram illustrating the configuration of an embodiment of the star network optical transmission system according to the present invention. FIG. 2A is a diagram illustrating the operation of the star network optical transmission system of FIG. 1A. Where the parts are the same as those of FIGS. 1A and 2A, the same numbers are used in FIGS. 5 and 6. Thus, detailed explanation is omitted in FIGS. 5 and 6. In FIG. 1A shown at 15 is an up optical fiber comprising a single mode optical fiber. In FIG. 2A, shown at 15a' is a section of the core 15a of the up optical fiber 15. Further, shown at 5a' and 5b' are sections of the cores 5a and 5b of an optical fiber 5.

The operation of an embodiment of the star network optical transmission system of the present invention will be described hereinafter. In order to suppress the generation of modal noises when a signal is transmitted from a transmission apparatus 1 comprising a laser diode 2 as a light source via a star coupler 4 for a multimode optical fiber, the speckle pattern which appears on the output terminal surface of a mixer portion 6 of the star coupler 4 needs to be kept stable against the vibration of an up optical fiber 3 and the temperature characteristics of the laser diode 2.

As shown in FIG. 1A, in the up optical fiber 15 comprising a single mode optical fiber, no speckle pattern is developed on the surface of the connection between the star coupler and an optical fiber 5 at the input portion because the mode excited by the laser diode 2 is a single mode. On the other hand, if the optical fiber 5 at the input portion of the star coupler 4 is a multimode optical fiber, a speckle pattern is developed on the surface of the connection between the optical fiber 5 at the input portion and the mixer portion 6. However, since the up optical fiber 15 is a single mode optical fiber, the speckel pattern appearing on the surface of the connection between the mixer portion 6 and the optical fiber 5 at the input portion exhibits no change even if the up optical fiber 15 vibrates or the temperature characteristics of the laser diode 2 exhibit fluctuation due to temperature. Therefore, stable coupling characteristics can be obtained without changing the speckle pattern developed on the surface of the connection between the mixer portion 6 and the output optical fibers 7, 8 and 9, making it possible to suppress the generation of modal noise.

Figure 3A:
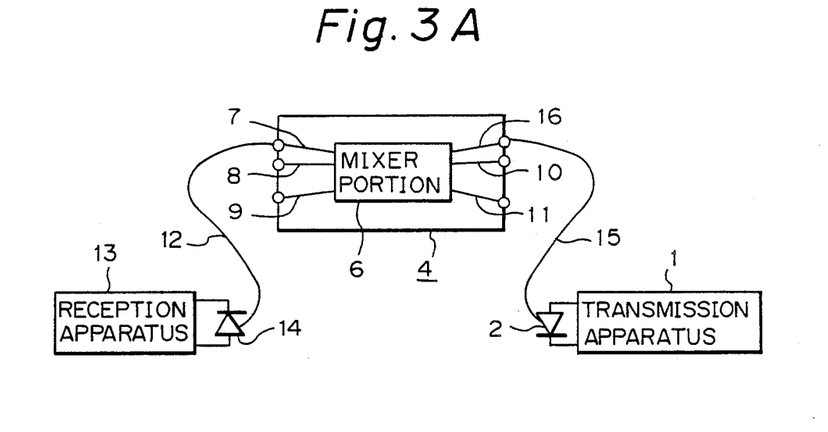
FIG. 3A is a diagram illustrating the configuration of still another embodiment of the star network optical transmission system according to the present invention.
Figure 4A:
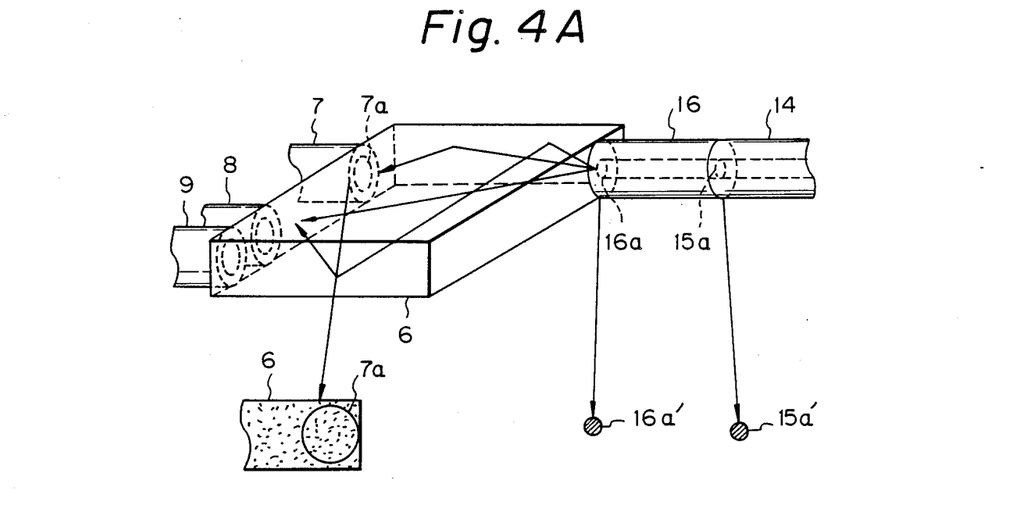
FIG. 4A is a diagram illustrating the operation of the star network optical transmission system of FIG. 3A.

FIG. 3A is a diagram illustrating the configuration of another embodiment of the star network optical transmission system according to the present invention. FIG. 4A is a diagram illustrating the operation of the star network optical transmission system of FIG. 3A. In the embodiment shown in FIG. 3A a single mode optical fiber is used as an optical fiber 16 at the input portion in the star coupler 4A. In accordance with this embodiment, the generation of the above described modal noise is further reduced. As shown in FIG. 4A, with a single mode optical fiber as an optical fiber 16 at the input portion in the star coupler 4, no speckle pattern is developed on the surface of the connection between the optical fiber 16 at the input portion and the mixer portion 6. Therefore, even if the star coupler 4 is subject to vibration, the mixer portion 6 stably excites from the optical fiber 16 at the input portion. This stabilizes the speckle pattern developed on the surface of the connection between the mixer portion 6 and the optical fibers 7, 8 and 9 at the output portion, preventing the generation of modal noise. Shown at 16a' in FIG. 4A is a section of the core 16a of the optical fiber 16 at the input portion. Further, shown at 15a' is a section of a core 15a of the optical fiber 15.

Figure 1B:
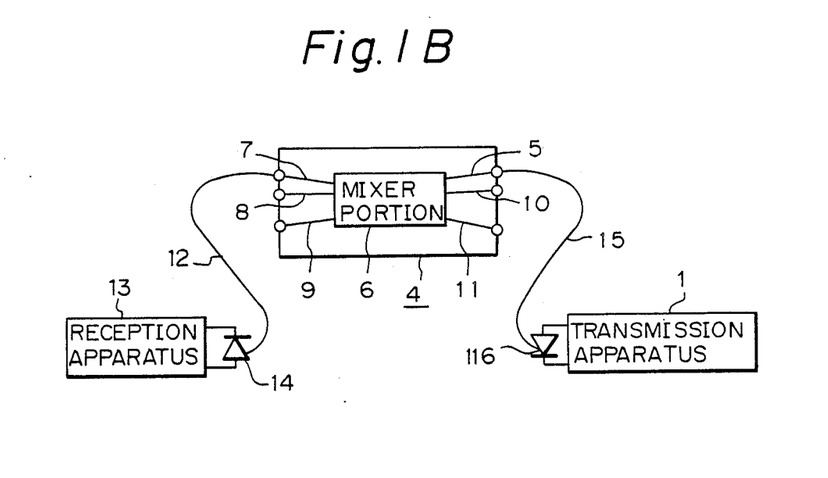
FIG. 1B is a diagram illustrating the configuration of another embodiment of the star network optical transmission system according to the present invention.
Figure 2B:
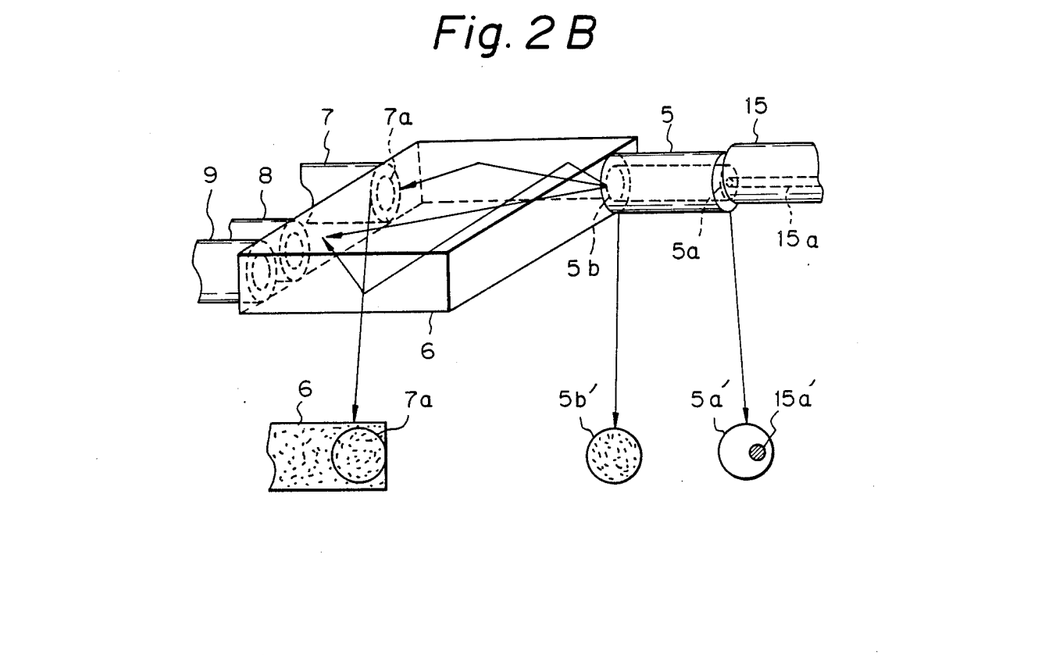

FIG. 1B is a diagram illustrating the configuration of an embodiment of the star network optical transmission system according to the present invention. Where the parts are the same as those of FIGS. 1B and 2B, the same numbers are used as in FIGS. 5 and 6. Thus, detailed explanation is omitted in FIGS. 1B and 2B. In FIG. 1B shown at 15 is an up optical fiber comprising a single mode optical fiber. In FIG. 2B, shown at 5a', 5b' and 15a' are sections of the core 5a, 5b and 15a, respectively.

Shown at 116 is a dnyamic single mode laser diode which oscillates in a monovertical mode during modulation.

The operation of this embodiment of the star network optical transmission system of the present invention will be described hereinafter with reference to FIG. 2B. One of the main causes of modal noise during the transmission of a signal from the optical transmission apparatus 1 via the star coupler 4 for multimode optical fiber is the speckle pattern fluctuation due to the vibration of an optical fiber and the fluctuation in the emission spectrum of the light source.

The effect developed when the up optical fiber 15 vibrates will be first discussed hereinafter with reference to FIG. 1B.

As shown in FIG. 1B in the up optical fiber 15 comprising a single mode optical fiber, no speckle pattern is developed on the surface of the connection between the star coupler 4 and the optical fiber 5 at the input portion because the mode excited by the dynamic single mode laser diode 116 is a single mode. On the other hand, if the optical fiber 5 at the input portion in the star coupler 4 is a multimode optical fiber, a speckle pattern is developed on the end surface of the connection between the optical fiber 5 at the input portion and the mixer portion 6. However, since the up optical fiber 15 is a single mode optical fiber, the speckle pattern developed on the end surface of the connection between the mixer portion 6 and the optical fiber 5 at the input portion exhibits no fluctuation even if the up optical fiber 15 vibrates. Therefore, stable coupling characteristics can be obtained without changing the speckle pattern developed on the end surface of the connection between the mixer portion 6 and the optical fiber 7 at the output portion, making it possible to suppress the generation of modal noise.

The effect of the emission spectrum of the light source will be discussed hereinafter. The emission spectrum fluctuation can be classified into two groups: emission spectrum fluctuation caused by mode distribution characteristics during high rate modulation and emission wavelength fluctuation due to temperature. The speckle pattern fluctuation caused by the emission wavelength fluctuation due to temperature is normally slow and causes little modal noise. Therefore, this fluctuation will be neglected herein. In FIG. 1B, since as a light source in the optical transmission apparatus 1 the dynamic single mode laser diode 116 which oscillates in a monovertical mode during modulation is used, there is no emission spectrum fluctuation due to mode distribution characteristic during high rate modulation. Therefore, the speckle pattern developed on the connection between the mixer portion 6 and the optical fiber 5 at the input portion and between the mixer portion 6 and the optical fiber 7 at the output portion exhibits no fluctuation. Thus, stable coupling characteristics can be provided between the mixer portion 6 and the optical fiber 7 at the output portion, suppressing the generation of modal noise.

Figure 3B:
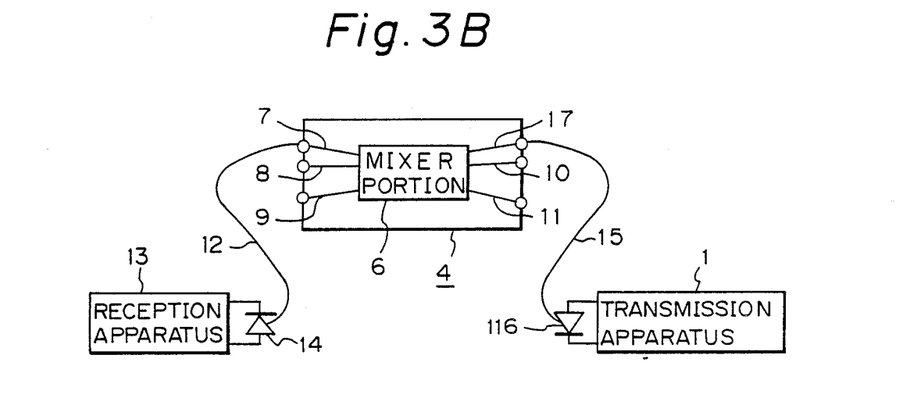
FIG. 3B is a diagram illustrating the configuration of another embodiment of the star network optical transmission system according to the present invention.
Figure 4B:
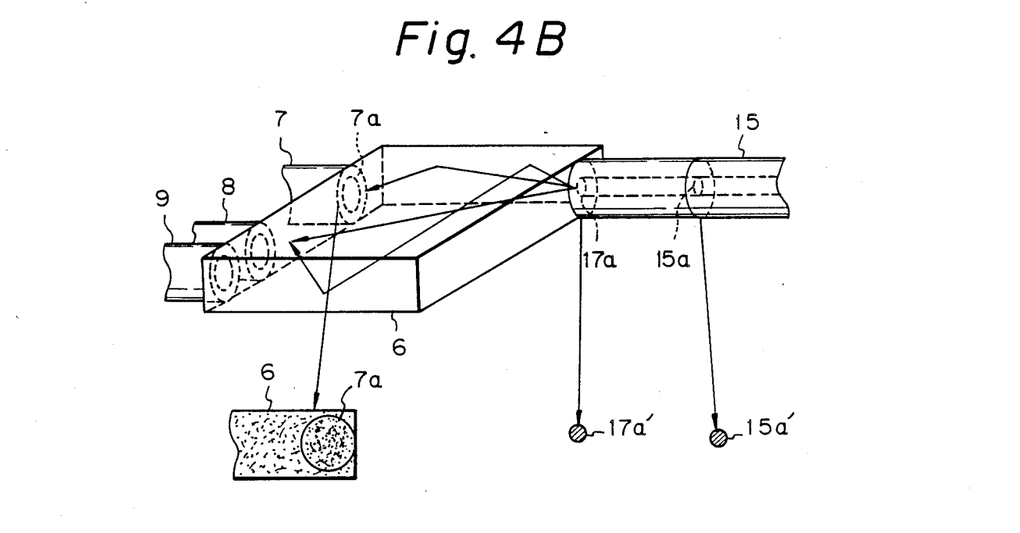
FIG. 4B is a diagram illustrating the operation of the star network optical transmission system of FIG. 3B.

FIG. 3B is a diagram illustrating the configuration of another embodiment of the star network optical transmission system according to the present invention. FIG. 4B is a diagram illustrating the operation of the star network optical transmission system of FIG. 3B. In the embodiment shown in FIG. 3B, a single mode optical fiber is used as an optical fiber 17 at the input portion in the star coupler 4. In accordance with this embodiment, the generation of the above described modal noise is further reduced. As shown in FIG. 4B, with a single mode optical fiber as an optical fiber 17 at the input portion in the star coupler 4, no speckle pattern is developed on the surface of the connection between the optical fiber 17 at the input portion and the mixer portion 6. Therefore, even if the star coupler 4 is subject to vibration, the mixer portion 6 stably excites from the optical fiber 16 at the input portion. This stabilizes the speckle pattern developed on the surface of the connection between the mixer portion 6 and the optical fiber 7, 8 and 9 at the output portion, preventing the generation of modal noise. Shown at 17a, in FIG. 4B is a section of the core 17a of the optical fiber 17 at the input portion.

While the invention has been described with reference to embodiments in which only one set of the transmission apparatus 1 is used, the same effects can be attained even when it applies to an embodiment in which a plurality of transmission apparatus 1 and a star coupler 4 are connected to each other via optical fibers 15 comprising a plurality of single mode optical fibers.

In these embodiments, the transmission apparatus 1 may be a transmission portion of a repeater, or the reception apparatus 13 may be a reception portion of a repeater. Thus, the transmission of signal via the star coupler 4 can be similarly effected with less modal noise.

Figures 7, 8:
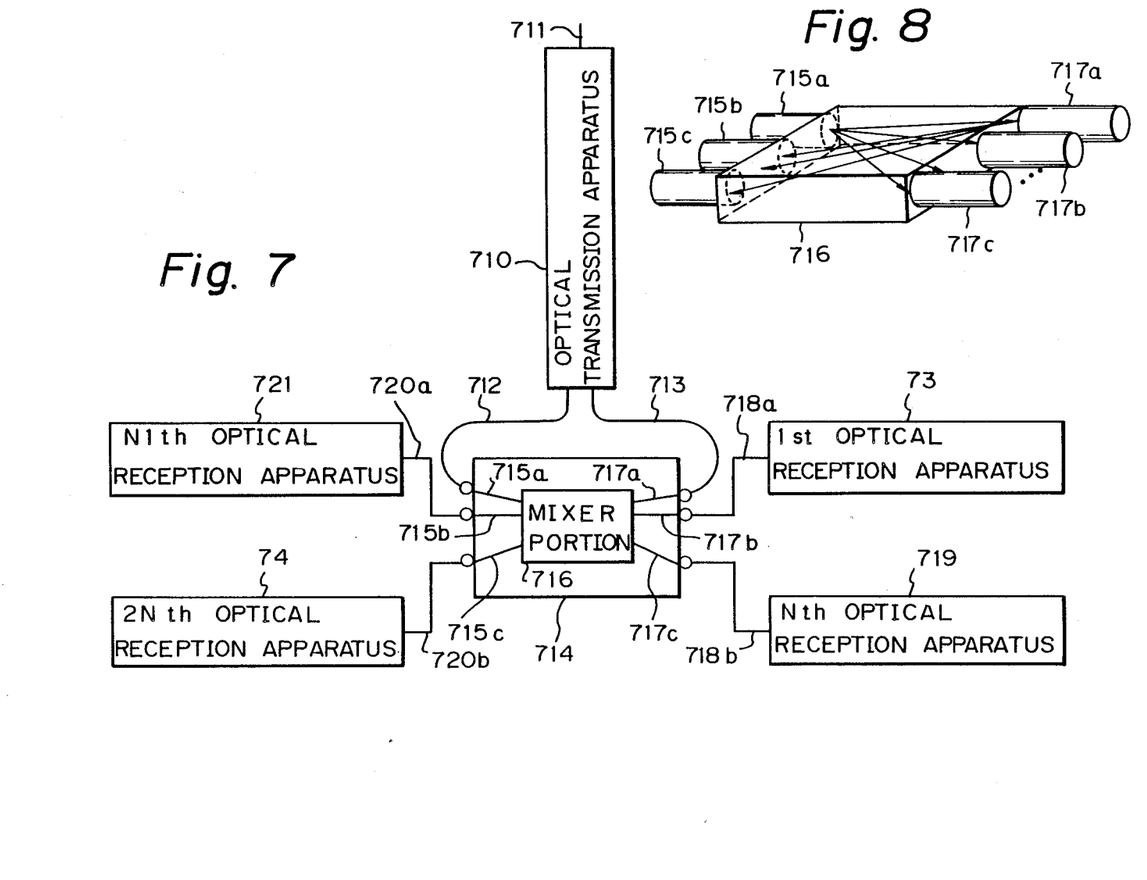
FIG. 7 is a configuration diagram of an embodiment of the star network optical transmission system according to the present invention.
FIG. 8 is a diagram illustrating the operation of a star coupler in the present embodiment.

Another embodiment of the present invention will be described hereinafter with reference to the drawings. FIG. 7 shows the configuration of an optical star network transmission system which is an embodiment of the present invention. Shown at 710 in FIG. 7 is an optical transmission apparatus having two outputs. Shown at 711 is an input terminal. Shown at 712 and 713 are optical fibers. Shown at 714 is an [N+1]×[N+1] star coupler. Shown at 715a, 715b and 715c are star coupler input optical fibers. Shown at 716 is a mixer portion. Shown at 717a, 717b and 717c are output optical fibers. Shown at 718a and 718b are optical fibers. Shown at 719 is an Nth optical reception apparatus. Shown at 720a and 720b are optical fibers. Shown at 721 is an [N+1]th optical reception apparatus.

FIG. 8 is a diagram explaining the operation of the star coupler 714.

Figure 9:
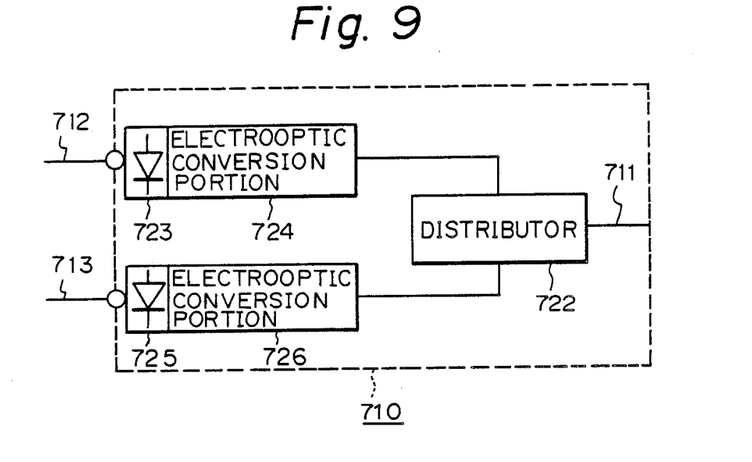
FIG. 9 is a configuration diagram of an optical transmission apparatus in the present embodiment.

FIG. 9 is a configuration diagram illustrating an embodiment of the optical transmission apparatus 710 having two outputs. Shown at 722 in FIG. 9 is a distributor. Shown at 723 and 725 are light emitting elements. Shown at 724 and 726 are electrooptic conversion portions.

Figure 10:
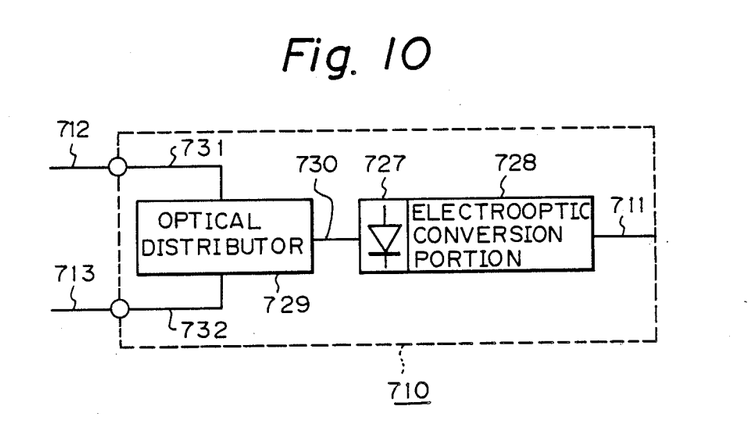
FIG. 10 is a configuration diagram of an optical transmission apparatus in another embodiment.

FIG. 10 is a configuration diagram illustrating a still further embodiment of the optical transmission apparatus 710 having two outputs. Shown at 727 in FIG. 10 is a light emitting element. Shown at 728 is an electrooptic conversion portion. Shown at 729 is an optical distributor. Shown at 730 is an input port. Shown at 731 and 732 are output ports.

The operation of the present embodiment will be described hereinafter with reference to FIGS. 7 and 8. The optical transmission apparatus 710 makes an electrooptic conversion of transmission signal inputted from the input terminal 711 to produce optical signal which is then outputted to two optical fibers 712 and 713. The optical fiber 712 is connected to the input optical fiber 715a of the star coupler 714. The optical signal outputted from the optical fiber 712 is transmitted by the input optical fiber 715a, diffused at the mixer portion 716, and then distributed into the output optical fibers 717a, 717b, 717c, etc. On the other hand, the optical signal outputted from the optical fiber 713 is similarly transmitted by the output optical fiber 717a in the direction opposite to that of the optical signal outputted from the fiber 12, diffused at the mixer portion 716, and then distributed into the input fibers 715a, 715b, 715c and so on. In principle, the optical signal inputted from the optical fiber 712 to the mixer portion 716 is not coupled to the optical fibers 715b and 715c due to the unidirectional diffusivity of optical signal at the mixer portion 716. Similarly, the optical signal inputted from the optical fiber 713 to the mixer portion 716 is not coupled to the optical fiber 717b and 717c in principle. Therefore, two signals transmitted by different paths in the transmission system are not crossed by each other. The optical signals outputted from the output optical fibers 717b and 717c in the star coupler 714 are transmitted by the optical fibers 718a and 718b to a first optical reception apparatus 73 and the Nth optical reception apparatus 719, respectively. Similarly, the optical signals outputted from the output optical fibers 715b and 715c in the star coupler 714 are trasmitted by the optical fibers 720a and 720b to the [N+1]th optical reception apparatus 721 and the 2Nth optical reception apparatus 74, respectively.

The operation of the above described star coupler will be described hereinafter with reference to FIG. 8. As can be seen in the explanatory view, the execution of 2N branchings can be accomplished by an $[N+1] \times [N+1]$ star coupler. The $[N+1] \times [N+1]$ star coupler is about half the $[1 \times 2N]$ star coupler in the width of the mixer portion and thus can be easily prepared. Furthermore, as compared to two $[1 \times N]$ star couplers, the $[N+1] \times [N+1]$ star coupler is half in the size of housing or mixer portion and thus is inexpensive. an embodiment wherein the optical transmission apparatus 710 output optical signals to two optical fibers is shown in FIGS. 9 and 10. In FIG. 9, signal from the input terminal 711 is divided by the distributor 722 into two signals on an electrical level which are then converted by the light emitting element 723 and the electrooptic conversion portion 724 and by the light emitting element 725 and the electrooptic conversion portion 726 to optical signals which are outputted to the optical fibers 712 and 713, respectively. In FIG. 10, transmission signal inputted from the input terminal 711 is converted by the light emitting element 727 and the electrooptic conversion portion 728 to an optical signal which is then inputted to the input port 730 of the optical distributor 729 from which it is distributed to the output ports 731 and 732 and then outputted to the optical fibers 712 and 713, respectively.

As compared to the conventional system, the embodiment shown in FIG. 9 further comprises the light emitting element 725, the electrooptic conversion portion 726, and the distributor 722. As compared to the conventional system, the embodiment shown in FIG. 10 further comprises the optical distributor 729. On the other hand, in the conventional system, a star coupler having 2N port outputs is formed, or a $(1 \times N)$ star coupler is added in order to obtain 2N branchings. Above-mentioned system according to the present invention can realize a smaller and cheaper branch system.

In FIG. 7, optical signal outputted from the optical transmission apparatus 710 to the optical fiber 712 returns to the optical transmission apparatus 710 via the star coupler 714 and the optical fiber 713. However, the amount of light coupled to the optical fiber 713 in the star coupler is about 1/N of the initial amount. Therefore, if the number of branches is great, the amount of light coupled to the optical fiber 713 is small, exerting no effect on the optical transmission operation. Optical signal outputted from the optical transmission apparatus 710 to the optical fiber 713 returns to the optical transmission apparatus 710 via the star coupler 714 and the optical fiber 712. However, this too, exerts no effect on the optical transmission operation.

Figure 11:
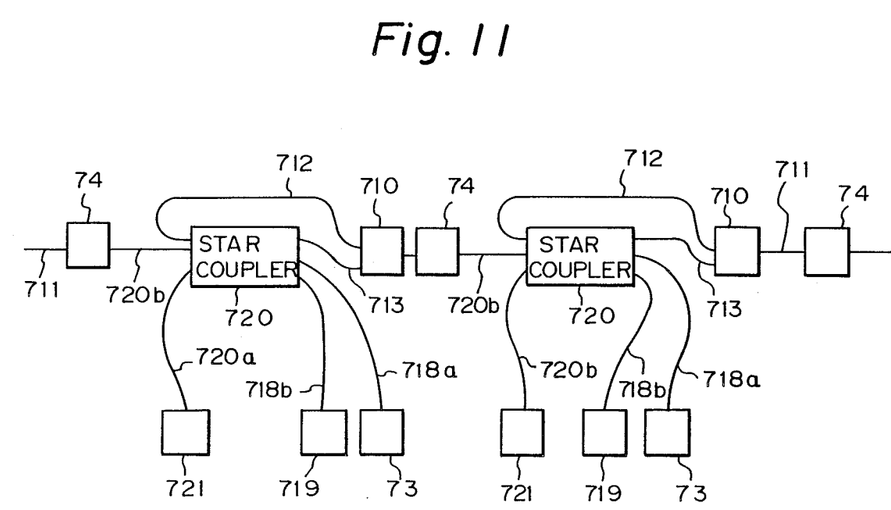
FIG. 11 is a configuration diagram of further embodiment of the present star network optical transmission system.

While these embodiments have been described with reference to the case where a single 2N branch system is formed, they have similar effects even when applied to a relay branched system in which the output of an optical reception apparatus 74 is relayed to an optical transmission apparatus 710 in a plural star network optical transmission system as shown in FIG. 11. By using an $[N+1] \times [N+1]$ star coupler, 2N branching are enable per one relay.

While the present invention has been described with reference to the star coupler comprising a slub type mixer shown in FIG. 8, similar effects can be obtained even when it is applied to a fiber-fused star coupler.

What is claimed is:

1. A star network optical transmission system having a star coupler as a center node, said star network optical transmission system comprising: a star coupler provided with an optical fiber at an input portion and an output portion, an optical transmission apparatus having a laser with a wavelength of λ as a light source; an up optical fiber exhibiting a single mode transmission characteristic at a wavelength of λ and connecting said optical transmission apparatus to said star coupler; an optical reception apparatus; and a down optical fiber exhibiting a multimode transmission characteristic at a wavelength λ and connecting said optical reception apparatus to said star coupler.

2. A system as claimed in claim 1 wherein the optical fibers at both said input portion and said output portion exhibit a multimode transmission characteristic to an optical signal transmitted by said star coupler.

3. A system as claimed in claim 1 wherein said optical fiber at said output portion exhibits a multimode transmission characteristic to an optical signal transmitted by said star coupler and wherein the optical fiber at said input portion exhibits a single mode transmission characteristic at the wavelength of λ.

4. A system as claimed in claim 3 wherein said laser oscillates in a monovertical mode during modulation.

5. A system as claimed in claim 1 wherein said laser oscillates in a monovertical mode during oscillation.

6. A star network optical transmission system having a star coupler as a center node, said star network optical transmission system comprising; a star coupler provided with an optical fiber at an input portion and an output portion; an optical transmission apparatus having a laser with a wavelength of λ which oscillates in a monovertical mode during modulation and which is used as a light source; an up optical fiber exhibiting a single mode transmission characteristic at a wavelength of $\lambda$ and connecting said optical transmission apparatus to said star coupler; an optical reception apparatus; and a down optical fiber exhibiting a multimode transmission characteristic at a wavelength $\lambda$ and connecting said optical reception apparatus to said star coupler.

7. A system as claimed in claim 6 wherein the optical fibers at both said input portion and said output portion exhibit a multimode transmission characteristic to an optical signal transmitted by said star coupler.

8. A system as claimed in claim 6 wherein said optical fiber at said output portion exhibits a multimode transmission characteristic to an optical signal transmitted by said star coupler and wherein the optical fiber at said input portion exhibits a single mode transmission characteristic at the wavelength of $\lambda$.

9. A star network optical transmission system, comprising a transmission type star coupler having a plurality of input ports and output ports and an optical transmission apparatus having two optical output terminals, wherein one of the two optical output terminals of said optical transmission apparatus is connected to one of the input ports of said transmission type star coupler via an optical fiber and wherein the other optical output terminal of said optical transmission apparatus is connected to one of the output ports of said transmission type star coupler via an optical fiber and including optical reception apparatus connected to the other input and output ports of said transmission type star coupler via optical fibers, wherein there are a plurality of said transmission type star couplers, and wherein an output from at least one of the optical reception apparatus connected to a port of one of said star couplers is applied as the input to the optical transmission apparatus applying inputs to another of said star couplers.

10. A system as claimed in claim 9 wherein said optical transmission apparatus includes means for receiving an electrical input, means for electrically distributing said electrical input to two electrical outputs, and an electrooptic conversion means connected to each output of said distributing means, said electrooptic conversion means converting the electrical input applied thereto into an optical output signal appearing at an output terminal from said apparatus.

11. A system as claimed in claim 9 wherein said optical transmission apparatus includes means for receiving an electrical input, an electrooptic conversion means for converting said electrical input into a corresponding optical signal, and optical distributor means for splitting the optical signal from said conversion means into two optical output signals, one of which is applied to each of said optical output terminals.

12. A star network optical transmission system, comprising:
a plurality of transmission type star couplers, each having a plurality of input ports and output ports;
a plurality of optical transmission apparatus, each having an input optical terminal and two output optical terminals, each of the two output optical terminals connected to one of the input ports of a corresponding one of the transmission type star couplers via an optical fiber,
a plurality of optical reception apparatus, each having an input connected to at least one of the remaining input ports and output ports of the transmission type star couplers via optical fibers and an output;
wherein the output of at least one of the optical reception apparatus which has an input connected to an output port of one of the transmission type star couplers is coupled to the input optical terminal of an optical transmission apparatus which has inputs coupled to another of the transmission type star couplers.

13. A system as claimed in claim 12 wherein said optical transmission apparatus includes means for receiving an electrical input, means for electrically distributing said electrical input to two electrical outputs, and an electrooptic conversion means connected to each output of said distributing means, said electrooptic conversion means converting the electrical input applied thereto into an optical output signal appearing at an output terminal from said apparatus.

14. A system as claimed in claim 12 wherein said optical transmission apparatus includes means for receiving an electrical input, an electrooptic conversion means for converting said electrical input into a corresponding optical signal, and optical distributor means for splitting the optical signal from said conversion means into two optical output signals, one of which is applied to each of said optical output terminals.

* * * * *